United States Patent
Amitai et al.

(10) Patent No.: US 7,884,985 B2
(45) Date of Patent: Feb. 8, 2011

(54) HIGH BRIGHTNESS OPTICAL DEVICE

(75) Inventors: Yaakov Amitai, Rehovot (IL); Jonathan Gelberg, Ra'anana (IL)

(73) Assignee: Lumus Ltd., Rehovot (IL)

( * ) Notice: Subject to any disclaimer, the term of this patent is extended or adjusted under 35 U.S.C. 154(b) by 0 days.

(21) Appl. No.: 12/467,151

(22) Filed: May 15, 2009

(65) Prior Publication Data
US 2009/0237804 A1    Sep. 24, 2009

Related U.S. Application Data

(62) Division of application No. 11/971,073, filed on Jan. 8, 2008, now abandoned, which is a division of application No. 10/937,207, filed on Sep. 9, 2004, now Pat. No. 7,339,742.

(30) Foreign Application Priority Data
Sep. 10, 2003    (IL) ...................................... 157838

(51) Int. Cl.
*G03H 1/00*    (2006.01)
(52) U.S. Cl. .............................. 359/13; 359/630; 345/7
(58) Field of Classification Search .................. 359/13, 359/599, 630; 362/246; 345/7, 8
See application file for complete search history.

(56) References Cited

U.S. PATENT DOCUMENTS

| | | | |
|---|---|---|---|
| 4,372,639 A | 2/1983 | Johnson | |
| 4,799,765 A | 1/1989 | Ferrer | |
| 5,278,532 A | 1/1994 | Hegg et al. | |
| 5,499,138 A | 3/1996 | Iba | |
| 5,909,325 A | 6/1999 | Kuba et al. | |
| 6,606,173 B2 * | 8/2003 | Kappel et al. | 359/15 |
| 6,825,987 B2 * | 11/2004 | Repetto et al. | 359/633 |
| 6,950,220 B2 | 9/2005 | Abramson et al. | |
| 2003/0030912 A1 | 2/2003 | Gleckman et al. | |
| 2005/0180687 A1 | 8/2005 | Yaakov | |

FOREIGN PATENT DOCUMENTS

EP    1096293    5/2001

OTHER PUBLICATIONS

International Search Report for Corresponding International Application PCT/IL2004/00815, Mailed Mar. 12, 2004.

* cited by examiner

*Primary Examiner*—Alessandro Amari

(57) ABSTRACT

There is provided an optical device, comprising a display source; a light-diffuser; an imaging optical module, and an output aperture from the optical device characterized in that the light diffuser is an angular, non-uniform diffuser of light for increasing a portion of light emerging from the display source that passes through the output aperture. A method for improving the brightness of an optical display is also provided.

14 Claims, 3 Drawing Sheets

HIGH BRIGHTNESS OPTICAL DEVICE

CROSS-REFERENCE TO RELATED APPLICATION

This application is a divisional of application Ser. No. 11/971,073 filed Jan. 8, 2008 for HIGH BRIGHTNESS OPTICAL DEVICE, which is a divisional of application Ser. No. 10/937,207, filed Sep. 9, 2004 for HIGH BRIGHTNESS OPTICAL DEVICE both of which are incorporated herein by reference.

FIELD OF THE INVENTION

The present invention relates to an optical display system and method, and particularly to a display system and method for see-through display applications.

The invention can be implemented to advantage in a large number of personal imaging applications, such as, for example, head-mounted displays (HMDs) and head-up displays (HUDs), hand-held displays, as well as binoculars, monoculars and bioculars. In addition, the same arrangement can be utilized for image projection systems such as front projectors for conference rooms and rear projection TV screens.

BACKGROUND OF THE INVENTION

One of the important applications for compact optical elements is in HM)s wherein an optical module serves both as an imaging lens and a combiner, in which a two-dimensional display is imaged to infinity and reflected into the eye of an observer. The image to be displayed is obtained directly from either a spatial light modulator (SLM) such as a cathode ray tube (CRT), a liquid crystal display (LCD), an organic light emitting diode array (OLED), or a scanning source and similar devices, or indirectly, by means of a relay lens or an optical fiber bundle. The display comprises an array of elements (pixels) imaged to infinity by a collimating lens and transmitted into the eye of the viewer by means of a reflecting or partially reflecting surface acting as a combiner for non-see-through and see-through applications, respectively. Usually, one of the most important issues to be addressed while designing an HMD, is the brightness of the optical system. This issue is mostly important for see-through applications, where it is desired that the brightness of the display will be comparable to that of the external scene.

The strive for high brightness has led to several different complex optical solutions, all of which, on the one hand, are still not sufficiently bright for many practical applications, and, on the other hand, suffer major drawbacks in terms of fabrication procedures and operational conditions.

DISCLOSURE OF THE INVENTION

The present invention facilitates the structure and fabrication of very high brightness display sources for, amongst other applications, HMDs. The invention allows an efficient use of the available light of the illumination source, i.e., a relatively high brightness system together with a relatively low power consumption can be achieved. The optical system offered by the present invention is particularly advantageous because it is substantially brighter than state-of-the-art implementations and yet it can be readily incorporated, even into optical systems having specialized configurations.

The invention also enables the construction of improved HUDs, which have become popular and now play an important role, not only in most modern combat aircraft, but also in civilian aircraft, in which HUD systems became a key component for low-visibility landing operation. Furthermore, there have been numerous suggestions for the use of HUDs in automotive applications for potentially assisting the driver in driving and navigation tasks. State-of-the-art HUDs, however, suffer from several significant drawbacks. All HUD's of the current structures require a display source that must be offset the brightness of the external scene to ensure that the projected data will be readable even with very bright ambient light. As a result, the present HUD systems usually require complicated high brightness display sources which are necessarily bulky, large, and require considerable installation space, which makes it inconvenient for installation and, at times, even unsafe to use.

An important application of the present invention relates to its implementation in a compact HUD, which alleviates the aforementioned drawbacks. In the HUD structure of the present invention, the combiner is illuminated with a compact display source having high brightness and small power consumption. Hence, the overall system is very compact and can be readily installed in a variety of configurations for a wide range of applications.

A further application of the present invention is to provide a compact display with a wide FOV for mobile, hand-held application such as cellular phones. In today's wireless Internet-access market, sufficient bandwidth is available for full video transmission. The limiting factor remains the quality of the display within the end-user's device. The mobility requirement restricts the physical size of the displays, and the result is a direct-display with a poor image viewing quality. The present invention enables a physically compact display with a large and bright virtual image. This is a key feature in mobile communications, and especially for mobile Internet access, solving one of the main limitations for its practical implementation. Thereby the present invention enables the viewing of the digital content of a full format Internet page within a small, hand-held device, such as a cellular phone.

Furthermore this invention is also suitable for use in the construction of the illumination for front and rear projection devices. Here the design replaces three complex dichroic polarizing beam splitters with accurate alignment requirements.

For all possible applications, the present invention is particularly advantageous for utilizing substrate-mode configuration, that is, for a configuration comprising a light-transmitting substrate having at least two major surfaces and edges: optical means for coupling the light from the imaging module into said substrate by total internal reflection, and at least one partially reflecting surface located in the substrate for coupling the light onto the viewer's eye. The combination of the present invention with a substrate-mode configuration results in a compact and convenient optical system having high brightness and low power consumption.

It is therefore a broad object of the present invention, to alleviate the drawbacks of state-of-the-art virtual image display devices and to provide an optical display system and method having improved performance.

In accordance with the present invention, there is provided an optical device, comprising a display source; a light-diffuser; an imaging optical module, and an output aperture from the optical device characterized in that said light diffuser is an angularly, non-uniform diffuser of light for increasing a portion of light emerging from the display source that passes through said output aperture.

The invention further provides a method for improving the brightness of an optical display, comprising providing an optical display system including a display source and an imaging module having an output aperture, and optically increasing the portion of light emerging from the display source that passes through said output aperture.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is a side view of a display system in accordance with the present invention;

FIG. 2 is a diagram illustrating the footprint of the light, coupled into the system pupil, on the front surface of the collimating lens, according to the present invention;

FIG. 3 is a side view of a device according to the present invention, utilizing an LCD light source;

FIG. 4 is a schematic illustration of a light diffuser consisting of an array of light source pixels and lenses, in accordance with the present invention;

FIG. 5 illustrates an enlarged view of the display source and the first lens of the optical system according to one embodiment of the present invention;

FIG. 6 illustrates a display system in accordance with the present invention, wherein the imaging system is a telecentric lens, and FIG. 7 illustrates a display system in accordance with the present invention, wherein the light waves are coupled into a substrate-mode element.

DETAILED DESCRIPTION OF PREFERRED EMBODIMENTS

Figure 1:
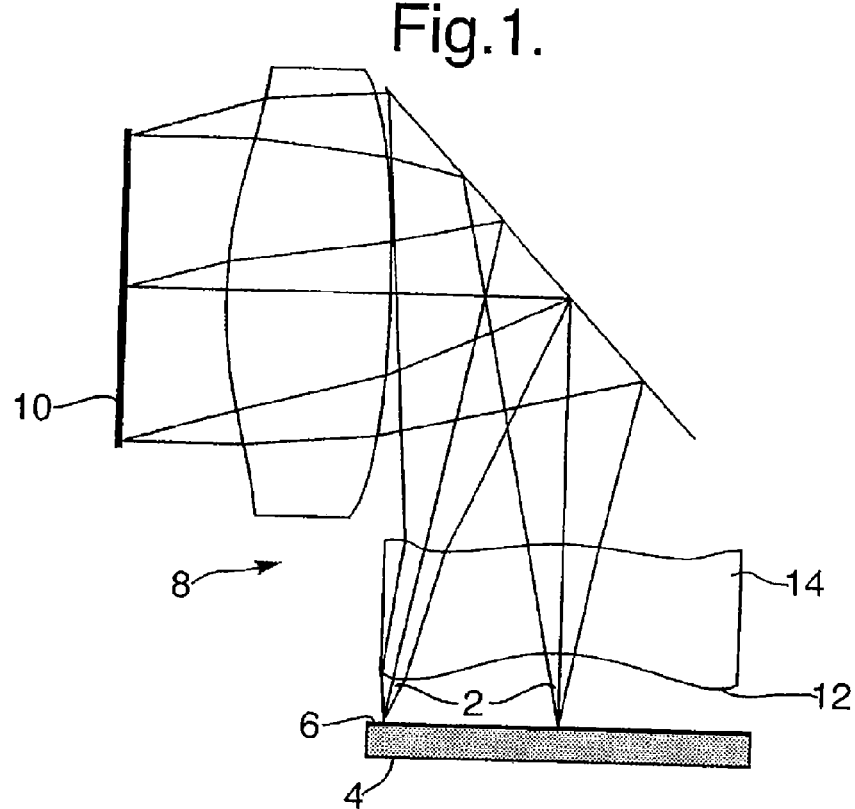

FIG. 1 illustrates an optical display system, wherein light waves 2 emerging from a display source 4 are diffused by a light diffuser 6, that can be an integral part of the display source, such that each light wave which is emerging from a single point in the display source is diverged into a finite solid angle. Usually, a Lambertian light diffusing mechanism is preferred, that is, a diffuser wherein the brightness is constant regardless of the angle from which it is viewed. The light waves are then imaged by an imaging module 8 and illuminate an output aperture 10 of the optical system. For direct view optical systems, this output aperture can be defined as a head-motion-box or an eye-motion-box for a biocular or a monocular respectively, that is, the location where the viewer can see the entire image simultaneously. Alternatively, for see-through optical systems, where the image is projected into the viewer's eye(s) through an optical combiner, the output aperture is defined as the active area of the external surface on the combiner's plane.

One of the major issues to be addressed while designing a display system is the image's brightness as seen by the viewer. This issue is utilizable for see-through applications, where it is desired that the brightness of the display will be comparable to that of the external scene, to allow acceptable contrast ratio and convenient observation through the combiner. For most of the optical systems it is not possible to ensure that the insertion loss of the system is small. For example, there are systems where the transmittance of the external view should exceed η (where η<1) and any color change of the original external scene is not allowed. Therefore the image brightness reduces through the combiner by a factor of $1/(1-\eta)$. In principle, high-brightness display sources can offset this difficulty, and indeed there are display sources such as CRTs and virtual retinal displays (VRDs) that can yield very high brightness. Nevertheless, this approach necessarily has a practical limitation. Not only are high-brightness display sources very expensive, they also have high power consumption with associated high electrical currents. Moreover, the size, volume and manufacturing costs of the high brightness devices are usually high. Furthermore, even such high-brightest displays reach an inherent limit in terms of the maximal brightness that can be achieved. As an example, the brightness of a VRD is limited by the maximal output power of the laser source, which is usually less than 100 mW for diode lasers. As for other display sources 4, for example, transmission LCDs, which are presently the most abundant source for small displays, the back-illumination light power is limited to avoid undesired effects like flaring, which decrease the resolution and contrast ratio of the display. Other approaches are therefore required to optimize the use of the available light from the source.

Figure 2:
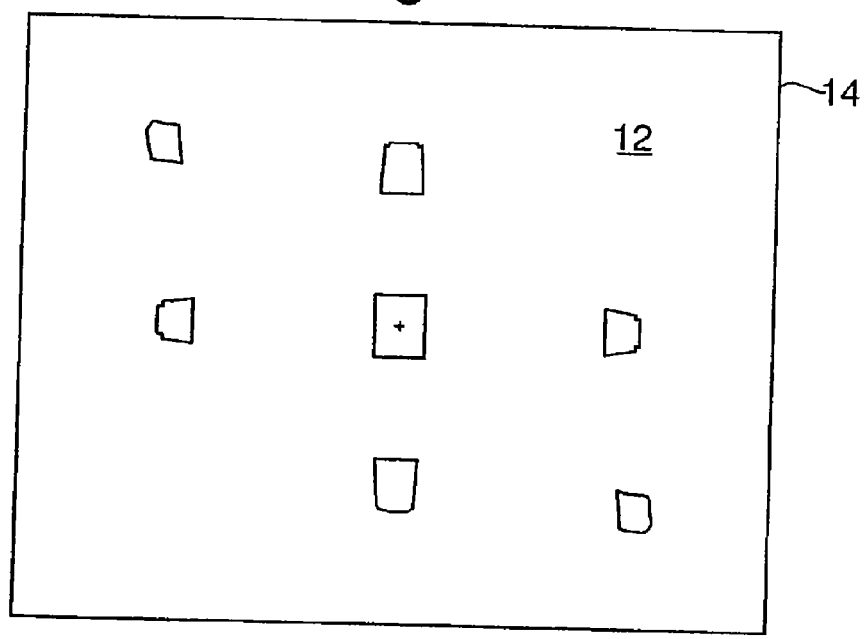

Consequently, the present invention offers another method to improve the overall brightness of the system by controlling the display source brightness without changing the input power. As shown in FIG. 1, to maximize the achievable brightness, it is desirable that most of the light that emerges from the display source couples into the output aperture 10 of the system. While FIG. 1 illustrates an optical layout of the imaging system, FIG. 2 illustrates the foot-print of the light, which is coupled into the output aperture 10, on the front surface 12 of the lens 14. Typically, most display sources exhibit a near-Lambertian distribution of the emitted light. That is, the light power is essentially distributed uniformly over the entire angular spectrum of 2π steradians. As can be seen in FIGS. 1 and 2, however, only a small portion of the angular illumination distribution of the display source is actually coupled into the output aperture 10. From each point source on the surface of the display, only a small cone of light of ~20-30° illuminates the footprint on the front surface 12 and is therefore coupled into the output aperture 10. Consequently, a significant increase in the brightness can be achieved if the light emerging from the display is concentrated inside this cone.

Figure 3:
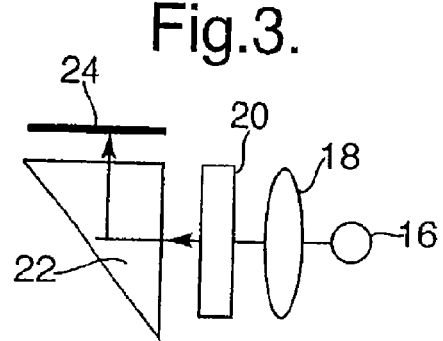

One method to achieve such directionality in the source illumination is to use an angular selective diffuser 6 for the LCD, that is, a diffuser 6 with a non-uniform diffusion mechanism, namely, a diffuser wherein its brightness depends on the angle from which it is viewed. FIG. 3 illustrates an example of a display system where the display source 4 is a transmission LCD. The light which emerges from the light source 16 and is collimated by lens 18, illuminates an LCD display source 20. The image from the LCD is collimated and reflected by an optical component 22 onto the output aperture 24. Usually, a conventional-diffuser 6 scatters the light uniformly in all directions. An angularly selective diffuser can spread the light in such a way that the light from each point on the surface of the display source diverges into the required angular cone. In this case the power that the LCD display 20 illuminates remains the same. For a 20-30° cone, the diverging angle of the light for each point is reduced by a factor of more than 50 as compared to the $2\pi$ steradians of a Lambertian source, and therefore the brightness of the light increases by the same factor. Hence, a significant improvement in the brightness of the system can be achieved with a minimal structural and manufacturing effort and without increasing the power consumption of the system. It is of particular advantage to exploit holographic diffusers that can control with a great precision the divergence angle of the scattered light waves and can as well achieve higher optical efficiencies than conventional diffusers.

The spatial coherence of the illuminating light source 16 is usually quite limited, i.e., the light source is not a point source but has a finite size. A typical value for a conventional LED is in the order of 1 mm. As a result, the output wave from the collimating lens 18 cannot be a pure plane wave but rather a continuity of plane waves with an angular spread of approximately 10°. Hence, if the required divergence of the spreading cones from the display surface has to be 30°, then the required divergence angle of the selective diffuser 6 should be of the order of 20°.

Figure 4:
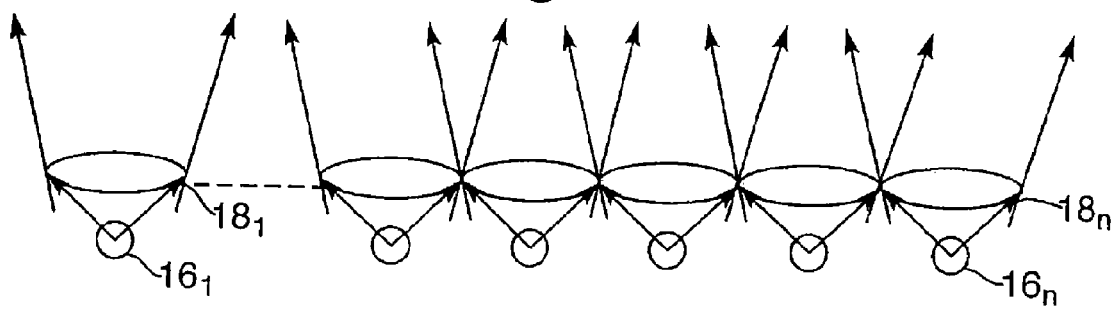

A different embodiment is shown in FIG. 4, which is utilizable not only for LCDs, but also for other display sources. Here, use is made of an array of micro-lenses $18_i$ to $18_n$ that is aligned with the pixels of the display source $16_i$ to $16_n$. For each pixel a micro-lens narrows the diverging beam that emerges from that pixel into the desired angular cone. In fact, this solution is more efficient when the fill-factor of the pixels is a small number, or when the achievable resolution of the display source is actually greater than the required resolution. Seen is an array of n pixels of light sources $16_i$ to $16_n$, wherein an array of n micro-lenses $18_i$ to $.18_n$ that is aligned with the pixels light sources $16_i$ to $16_n$, narrows the diverging beams that emerge from the pixels. An improved version of this solution is to design the emitting distribution function of the pixels in the pixel-array to make each pixel diverge into the required angle. For example, in OLED displays, efforts are usually made to increase the divergence angle of the single LEDs in order to allow viewing from a wide angle. For the instant display application, however, it is advantageous to keep this divergence angle small, in the order of 20-30°, in order to optimize the brightness of the system.

Figure 5:
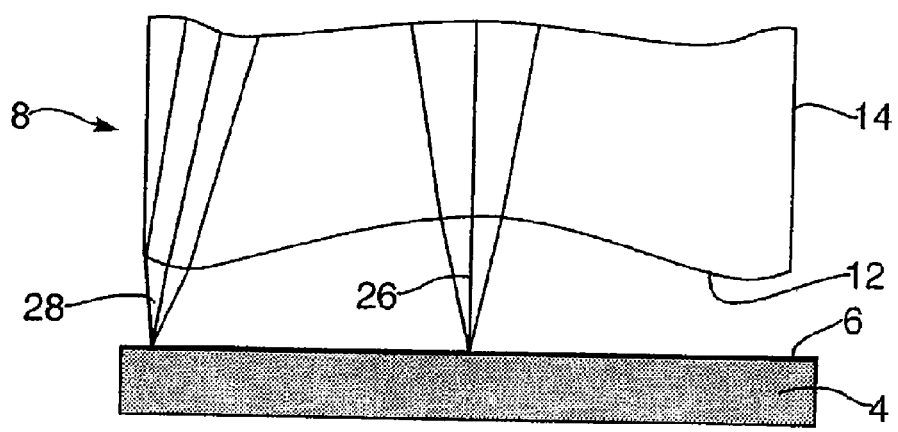

FIG. 5 illustrates an enlarged view of the display source 4 and the first lens 14 of the optical system illustrated in FIG. 1. As can be seen, only a small cone of light of ~30° indeed diverges from each point in the display source to illuminate the exit pupil, however, the propagation direction of each cone is actually different. While for the central point of the source the chief ray 26 of the beam is normal to the display plane and cone itself is symmetrical around the normal, the chief ray 28 of the marginal point is inclined at an angle of ~20° to the normal. In this case, there are three methods to ensure that the rays from the entire display source will illuminate the exit pupil. Thus, the present invention utilizes a non-uniform light diffuser 6, which can be embodied by either an angular selective diffuser wherein the diffusion direction depends on the exact location on the diffuser surface, or a micro-lenses array having a period which is slightly different than that of the display pixel array. The fabrication of such arrays are difficult, and thus, an alternative method utilizing a diffuser 6 having a divergence angle that covers the rays spreading from the entire display source, is proposed. Although this method is simple to implement it is clear that it reduces the brightness of the system. The required divergence in the example given above is approximately 70°, hence, the output brightness is decreased by a factor of ~5.5.

A different approach to solve these difficulties is to utilize a telecentric lens as the imaging module, that is, to use a lens in which the aperture stop is located at the front focus, resulting in the chief rays being parallel to the optical axis in the display space. Usually, the image from a telecentric lens remains in focus over the same depth of field as that of a conventional lens working at the same f-number. Telecentric lenses provide constant magnification at any object distance, making accurate dimensional measurements over a larger range of object distances than conventional lenses. This property is important for gauging three-dimensional objects, or objects whose distance from the lens is not known precisely.

Figure 6:
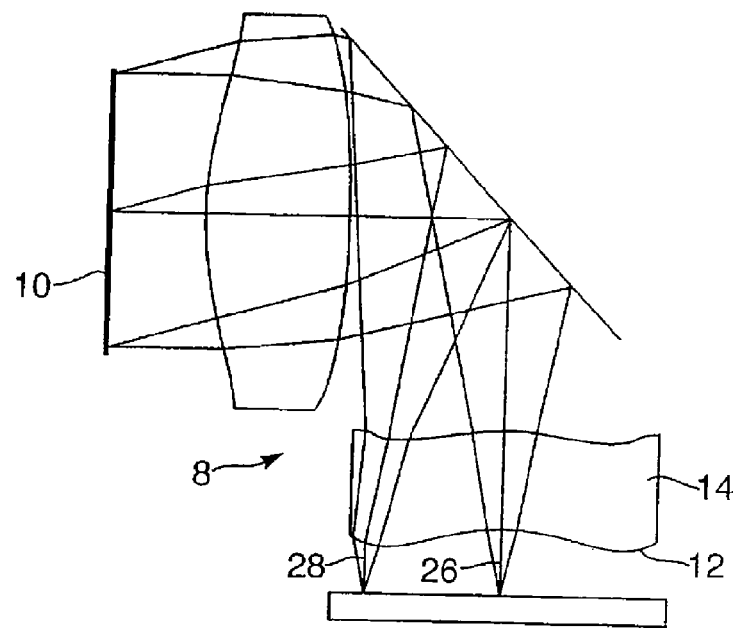

FIG. 6 illustrates a modified display system as compared to the system illustrated in FIG. 1. The main modification is that the surfaces of the imaging module 8, and especially surface 12, are now structured to provide a telecentric system. As can be seen, both the chief ray 26 of the central wave, as well as the chief rays 28 originating at the edges of the display are normal to the display plane. A uniform divergence angle of ~30° is sufficient to ensure that the waves of the entire display will cover the exit pupil. This can be obtained by using a uniform angular selective diffuser 6 or with a micro-lens array, so that the optimal brightness can be reached.

The degree of telecentricity is usually measured by the angle of the chief ray in the corner of the field. In machine vision, a standard commercial lens may have chief ray angles of 20 degrees or more, wherein telecentric lenses have chief ray angles less than 0.5 degree and some telecentric lenses even have chief ray angles of less than 0.1 degree. The manufacturing of a lens having a high degree of telecentricity is complex which leads to high manufacturing efforts. For the present invention, however, the telecentricity is not required for the measurement of accuracy and the degree of telecentricity is not critical. Therefore, a simple lens with a telecentricity of a few degrees is sufficient to achieve the required optimal brightness.

A further manner to achieve the required illumination on the entrance pupil of a projecting module, is applicable mainly for LCD based optical systems. As can be seen in FIG. 3, the light from the source 16 is collimated by the lens 18 into a plane wave, or rather into a continuity of plane waves. Instead of collimating the light source, however, it is possible to focus it to a different focal plane. As can be seen in FIG. 5, the chief ray 28 of the marginal point is inclined at an angle of ~20° to the normal. Assuming that the display source has a lateral dimension of 10 mm, the chief rays from the pixels of the display all converge to a virtual point, located approximately 15 mm from the display source. Therefore, by utilizing the lens 18 to converge the light 16 to this point, the required light divergence from the display source can be achieved. In this specific case, in order to achieve the desired illumination, the lens 18 should have a wide aperture and both the light source 16 and the lens 14 should have a very large numerical aperture. By changing the design of the lens 12, however, such that the chief ray of the marginal point would be inclined at an angle of ~10°, instead of 20°, to the normal, it is possible to achieve the required light divergence on the display source 20. Hence, in this case a simpler illumination device can be constructed with no need for a complicated telecentric lens. In practice, the structure of an optical system according to the present invention can compromise between the structural and manufacturing efforts and the specified brightness according to the specific requirements of the optical system.

The present invention thus facilitates the structure and fabrication of very high brightness display sources for, amongst other applications, optical systems with see-through capabilities where the brightness of the projected image is critical, such as HMDs and HUDs, where the light from the display source reaches a single eye and both eyes of an observer, respectively. In addition, the present invention can be used for the illumination of front and rear projection devices where high brightness is required to allow convenient observation. Since the photonic efficiency of the system can be high, that is, almost all the photons emerge from the display source reach the system output aperture, the invention allows relatively high brightness systems together with relatively low power consumption. For the HMD and the HUD applications, the present invention is particularly advantageous, by utilizing light-guided optics configurations.

Figure 7:
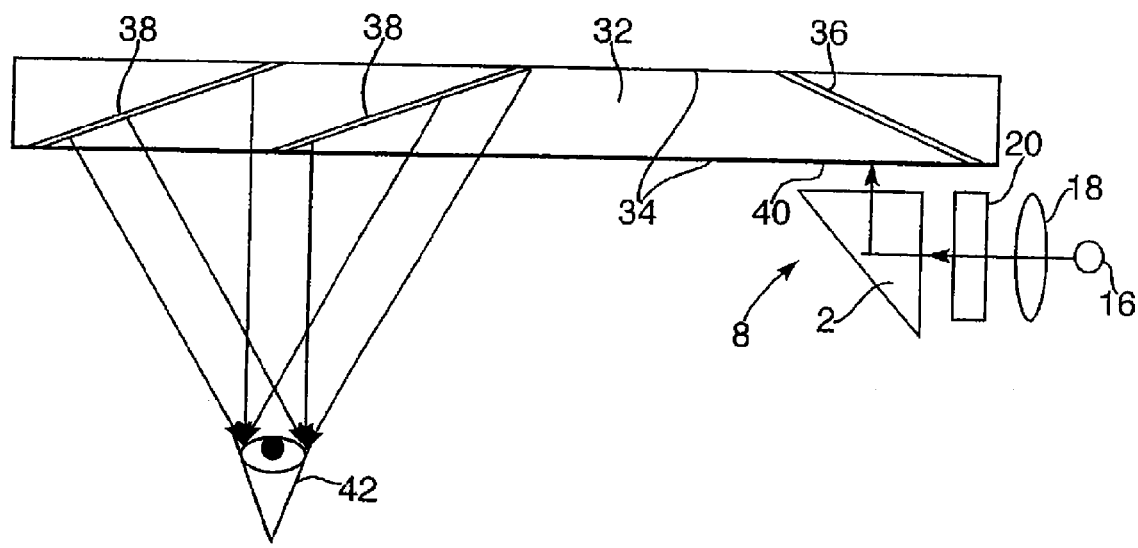

FIG. 7 illustrates an optical system 30 according to the present invention, wherein the projection module is a light-guide optical element (LOE) comprising a light-transmitting substrate 32 having at least two major parallel surfaces 34, an optical coupler 36 for coupling the light from the imaging module 8 via a light admitting surface 40 into the substrate 32 by total internal reflection, and at least one partially reflecting surface 38 located in said substrate for coupling the light onto the viewer's eye-motion box 42. The combination of the present invention with an LOE configuration yields a very compact and convenient optical system along with very high brightness and low power consumption.

The above-described optical means 36 is an example of a method for coupling input waves into the substrate. Input waves could, however, also be coupled into the substrate by other optical means, including, but not limited to, folding prisms, fiber optic bundles, diffraction gratings, and the like.

Also, in the embodiment of FIG. 7, input waves and image waves are located on the same side of the substrate, however, input and image waves could just as well be located on the opposite sides of the substrate. Other applications, in which input waves could be coupled into the substrate through one of the substrate's lateral edges, are also envisioned.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An optical device, comprising:
    a display source emitting light waves;
    a diverging light source illuminating the display source;
    a converging lens located between the light source and the display source;
    a light diffuser for non-uniformly diffusing the light of the display source;
    an output aperture for emitting light from the optical device; and
    an imaging lens located between the display source and the output aperture for setting the light waves at the output aperture to a specific brightness, the imaging lens being a telecentric lens.

2. The optical device according to claim 1, wherein the telecentricity of said imaging optical system is set to result in at least said specific brightness.

3. The optical device according to claim 1, wherein the telecentricity of said imaging optical system is more than 0.5°.

4. The optical device according to claim 1, wherein the telecentricity of said imaging optical system is less than 10°.

5. The optical device according to claim 1, wherein said light diffuser diffuses the light interposed between the display source and said converging lens.

6. The optical device according to claim 1 further comprising a light-transmitting substrate having a light-emitting surface and at least one surface located inside said substrate for coupling the light out of said substrate.

7. The optical device according to claim 6, wherein each light wave emerging from a single point on the display source is diverged into a predetermined finite solid angle, such that light waves from the entire display source are coupled into said substrate by total internal reflection.

8. The optical device according to claim 7, wherein optical nature and structure of the combination of the components of said optical device results in coupling the light waves into a single eye of an observer.

9. The optical device according to claim 7, wherein optical nature and structure of the combination of the components of said optical device results in coupling said light waves into both eyes of an observer.

10. The optical device according to claim 6, wherein input waves and image waves are located on the same side of said substrate.

11. The optical device according to claim 6, wherein input waves and image waves are located on the opposite sides of said substrate.

12. The optical device according to claim 1, wherein optical nature and structure of the combination of said light source, converging lens, display source and light diffuser, dictate the solid angles, resulting in coupling said light waves into said substrate by total internal reflection.

13. The optical device according to claim 1, wherein said optical device is utilized as a head mounted display.

14. The optical device according to claim 1, wherein said optical device is utilized as a head-up display.

* * * * *